March 4, 1952  A. LILJEFORS  2,587,866
CONTROLLABLE HYDRAULIC POWER TRANSMISSION
Filed Nov. 24, 1947  2 SHEETS—SHEET 1
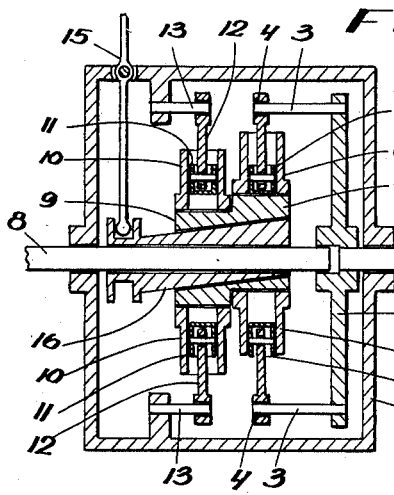
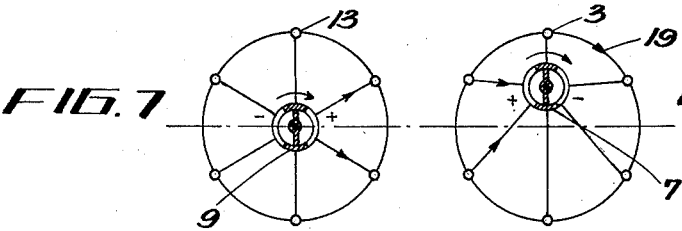

March 4, 1952   A. LILJEFORS   2,587,866
CONTROLLABLE HYDRAULIC POWER TRANSMISSION
Filed Nov. 24, 1947   2 SHEETS—SHEET 2

Inventor
Anders Liljefors
By Wenderoth, Lind & Ponack
attorneys

Patented Mar. 4, 1952

2,587,866

UNITED STATES PATENT OFFICE 2,587,866

CONTROLLABLE HYDRAULIC POWER TRANSMISSION

Anders Liljefors, Karlskrona, Sweden

Application November 24, 1947, Serial No. 787,674
In Sweden May 28, 1946

Section 1, Public Law 690, August 8, 1946
Patent expires May 28, 1966

1 Claim. (Cl. 60—53)

The present invention consists in a method of mechanical power transmission and in a controllable hydraulic drive therefor serving substantially as a variable speed gear between a driving shaft and a driven shaft, the principal object of the invention being to reduce, as far as possible, the power losses inevitably occurring in the transmission. By means of the invention this result is attained to such an extent that the efficiency will be practically 100 per cent when the shafts rotate at equal speeds and then decrease continuously according to a sloping curve proportionally to the change of speed.

Generically, according to the invention this is accomplished by transmitting the power constituted by the torque of the driving shaft and the rotational speed of the driven shaft directly as in a rigid coupling, and transmitting the power constituted by the relative rotational speed of the shafts and the difference between the torques by means of fluid pumping, this being the characteristic feature of the method of the invention.

On the basis of this method generally characterizing the invention the mechanical structure is, in the practical application, capable of being varied but suitably the mechanical drive is carried out in the form of two pump cylinder blocks being each rotatably mounted on a radially adjustable hub ring, said hub rings being rigidly interconnected and rotating with the driven shaft, the cylinders of one block co-operating with pistons the connecting rods whereof are pivotally mounted on pins rigidly carried by the driving shaft, and the cylinders of the other block co-operating with pistons the connecting rods whereof are pivotally mounted on pins carried by a stationary housing, which encloses the transmission.

The principles of the invention will now be explained with reference to the accompanying drawing, in which:

Fig. 1 is a diagrammatic longitudinal section; and

Fig. 2 is a diagrammatic transversal section of the transmission according to the invention;

Figs. 3–6 are diagrammatic showings illustrating different positions of one (the primary) hub ring;

Figure 11:
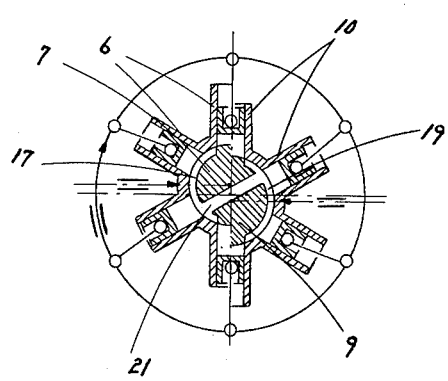
Figure 12:
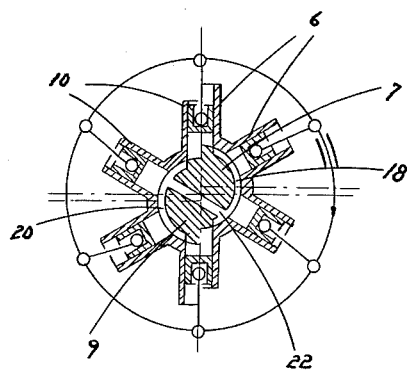
Figure 13:
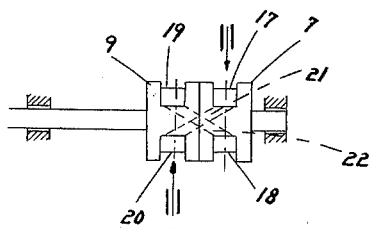

Figs. 7–10 in a similar manner illustrate the respective corresponding positions of the other (secondary) hub ring;

Figure 11 is a diagrammatic section of the transmission disclosing to the left of the vertical central line a transversal section of the rotating cylinder block and to the right of the line a transversal section of the non-rotating cylinder block;

Figure 12 is a view similar to Figure 11 and disclosing to the right of the vertical central line a transversal section of the rotating cylinder block and to the left of the line a transversal section of the non-rotating cylinder block but in another position than that of Figure 11; and Figure 13 is a plan view of the driven shaft and the two hubs the arrows of Figure 11 being also indicated in Figure 13.

The driving (or primary) shaft 1 is rigidly connected to a circular plate or disc 2, and adjacent to the outer rim of the latter there is provided a number of circumferentially spaced pins 3 (six such pins being shown in the drawing, the number being in actual practice suitably an uneven one), each one pivotally carrying a piston rod or connecting rod 4 provided with a piston 5. These pistons 5 operate in a corresponding number of cylinders 6, which are circumferentially, suitably in a star-like manner, joined together to form a block, the latter being in its turn rotatably supported on a hub ring 7, which is adapted to rotate with the driven (secondary) shaft 8. The hub ring 7 is rigidly connected with a second hub ring 9 which is also mounted on the driven shaft 8, and this hub ring 9, in the same manner as hub ring 7, rotatably carries a unitary block of cylinders 10, in which pistons 11 operate. The piston rods or connecting rods 12 of these pistons 11 are articulated on a corresponding number of pins 13 which are rigidly carried by a housing 14 enclosing the transmission and circumferentially spaced peripherically thereof.

Both the driving shaft 1 and the driven shaft 8 are journalled in the housing 14 and furthermore, if desired, provided with bearing or guiding means within the same or in each other.

The radial position of the two hub rings 7 and 9 is adjustable from the exterior through displacement of an element 16 adapted to be actuated by means of a suitable lever 15 or the like, said member 16 being rotatable with the driven shaft 8 and slidable on the same by means of said lever 15. As is shown in the drawing, said element 16 is formed and positioned in such a manner that, during its displacement, it performs a wedging action between one side of shaft 8 and the hub rings, whereby the radial position of the latter is altered. The hub rings are so interrelated that they cannot both of them at the same time occupy a centrical position relative to shaft 8.

The hub ring 7 is provided with recesses 17 and 18 which in different positions of hub ring 7 relative to the corresponding cylinder block enter into communication with different ones of the cylinders 6. The other hub ring 9 is provided with similar recesses 19 and 20 which in a similar manner enter into communication with the cylinders 10. These four recesses are in pairs interconnected through a suitable passage in such a manner that the recess 17, which is in Figs. 2, 11 and 12 situated to the left, is communicating with the right hand recess 19 of the hub ring 9, and recess 18 is communicating with the left hand recess 20 of hub ring 9 through ports 21 and 22.

The operation of the device is diagrammatically indicated in Figs. 3–13 which are also explanatory for the method according to the invention. Figs. 3 and 7 show the arrangement in a position corresponding to Figs. 1 and 2; Fig. 3 pertaining to the primary side (the unit co-operating directly with the driving shaft 1) and Fig. 7 to the secondary side (the unit co-operating directly with the driven shaft 8). In this instance, by means of lever 15 and member 16, the hub ring 7 has been set into an eccentrical position, while the hub ring 9 will assume a centrical position. When the parts are in these relative positions and shaft 1 is rotated, for example in the direction indicated by the arrow (Figs. 3 and 7), the pistons situated to the left of a vertical centre line through the rotational axis will tend to be forced into their respective cylinders (compare hereto Fig. 2), while the pistons to the right of said line will tend to be withdrawn from their respective cylinders. Consequently the left hand pistons tend to cause a pumping action pressing liquid from their cylinders through the recesses 17 to the right hand recess of hub ring 9, while the right hand pistons tend to draw liquid from the left hand recess of said hub ring 9. None of these tendencies, however, can succeed, since the hub ring 9, as is seen from Fig. 7, assumes a centrical position and thus the pistons 11 are not able to perform any motion whatever in their cylinders 10. As a result, the arrangement will act as a rigid coupling, and the hub rings 7 and 9 are constrained to partake in the rotational movement of the unit comprising the cylinders 6, i. e. shaft 8 will rotate at the same speed as shaft 1.

Figure 11 discloses to the left of the vertical central line a transversal section of the rotating cylinder block 6 and to the right of the said line a transversal section of the non-rotating cylinder block 10. The two recesses 17 and 19 are interconnected through the port 21 and they therefore always connect a number of cylinders of each block with each other.

When the cylinder block 6 rotates in the direction of the arrow there arises a pressure in the fluid resulting in two forces in opposite directions against the hubs 7 and 9 (indicated by arrows), and the driven shaft then rotates with a velocity which is dependent on the mutual largeness (or difference in largeness) of the stroke volumes of the two cylinder blocks.

Figure 12 discloses to the right of the vertical central line a transversal section of the rotating cylinder block 6 and to the left of the said line a transversal section of the non-rotating cylinder block 10 but in another position than that of Figure 11.

The two recesses 18 and 20 are connected through the port 22. When the device is rotating in the direction of the arrow the port 22 and the recesses form a return conduit for the fluid from the cylinders 10 to the cylinders 6.

Figure 13 is a plan view of the driven shaft and the two hubs the arrows of Figure 11 being also indicated in Figure 13.

In Figs. 4 and 8 another position of the hub rings 7 and 9 is illustrated in which the eccentricities of the rings are equal but oppositely directed. At this time, however, the tendency of the pistons 5 to pump liquid to or from the cylinders 10 and the recesses of the hub ring 9 during the rotation of shaft 1 can be partly satisfied, as the hub ring 9 assumes an eccentrical position so that during the rotation it will cause a displacement of the cylinders 10 relative the pistons 11. Consequently, shaft 8 will rotate at a reduced speed relative to shaft 1.

If the eccentricity of the hub rings is further successively altered until they occupy the position indicated in Figs. 5 and 9, the pumps of the primary side will not, as hub ring 7 assumes a centrical position, effect any pumping action whatever during the rotation of the shaft, and consequently the block containing the cylinders 6 will rotate on the hub ring 7 which is at rest. Then shaft 8 will be immobile.

If the eccentricity of the hub rings is still further changed the hub rings, as can be seen in Figs. 6 and 10, will be eccentric in the same direction which causes the shafts 1 and 8 to be rotated in opposite directions relative to each other, i. e., if shaft 1 continues to rotate as assumed in the above example, shaft 8 will rotate backwards.

As compared to hydraulic transmissions of hitherto known types the present invention involves essential advantages, in that the pumping power required for speed variation will never be greater than the amount corresponding to the relative rotational speed as between the shafts and the difference between their torques, the remainder of the amount of power in question being transmitted through direct coupling. Hence the efficiency of the arrangement will be the greatest possible. Furthermore the arrangement permits a completely continuous control of the rotational speed of shaft 8 from a maximum in one sense to a maximum in the opposite sense without altering the rotational speed of shaft.

What I claim and desire to secure by Letters Patent is:

A hydraulic transmission comprising a driving shaft and a driven shaft, a first fluid pump system connected for rotation with said driving shaft, an operating member for the pumps in said pump system connected to said driven shaft, a second operating member connected to said driven shaft, a second fluid pump system acting as a fluid motor and adapted to operate said second operating member, each said pump system comprising a plurality of cylinders interconnected to form a unitary block, the operating chambers of both said pump systems being arranged to intercommunicate through valve ports and channels in the driven shaft, said operating members comprising two radially adjustable hub rings rotatable with said driven shaft and rigidly connected to each other, each of said cylinder blocks being rotatably mounted on a respective one of said hub rings, said hub rings having recesses at opposite sides thereof, said recesses being adapted in different positions to co-operate with different cylinders of their respective cylinder blocks, and being further interconnected in pairs in such a manner that the recess situated at one side of a common axial plane of said hub rings is connected to the recess situated at the opposite side of said common axial plane in the other hub ring, and that the recess situated at the other side of said common axial plane of the first-mentioned hub ring is connected to the recess of the other hub ring, which is situated at the same side of said common axial plane as the first-mentioned recess in the first-mentioned hub ring.

ANDERS LILJEFORS.

REFERENCES CITED

The following references are of record in the file of this patent:

UNITED STATES PATENTS

| Number | Name | Date |
|---|---|---|
| 1,502,310 | Magie et al. | July 22, 1924 |
| 2,074,583 | Gölz | Mar. 23, 1937 |

FOREIGN PATENTS

| Number | Country | Date |
|---|---|---|
| 172,313 | Great Britain | Dec. 1, 1921 |